United States Patent
Minoshima et al.

(10) Patent No.: US 8,840,189 B2
(45) Date of Patent: Sep. 23, 2014

(54) TRANSPORTER VEHICLE

(75) Inventors: Toshikazu Minoshima, Kasumigaura (JP); Michio Fushiki, Tsuchiura (JP); Katsumi Tamura, Omitama (JP); Takao Kurosawa, Ushiku (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 13/390,695

(22) PCT Filed: Dec. 9, 2010

(86) PCT No.: PCT/JP2010/072114
§ 371 (c)(1),
(2), (4) Date: Feb. 16, 2012

(87) PCT Pub. No.: WO2011/089792
PCT Pub. Date: Jul. 28, 2011

(65) Prior Publication Data
US 2012/0274121 A1    Nov. 1, 2012

(30) Foreign Application Priority Data
Jan. 20, 2010  (JP) .................................. 2010-009759

(51) Int. Cl.
*B60P 1/16*    (2006.01)
(52) U.S. Cl.
USPC ........................................................ 298/22 R
(58) Field of Classification Search
USPC .............................................. 298/22 R, 19 R
See application file for complete search history.

(56) References Cited

U.S. PATENT DOCUMENTS

| | | | | |
|---|---|---|---|---|
| 4,511,974 A * | 4/1985 | Nakane et al. | ................. | 701/124 |
| 4,518,044 A * | 5/1985 | Wiegardt et al. | ................... | 172/7 |
| 4,724,372 A * | 2/1988 | Takeuchi et al. | .............. | 318/685 |
| 5,393,936 A * | 2/1995 | Tyhy et al. | ..................... | 177/138 |
| 5,584,224 A * | 12/1996 | Davies et al. | .................... | 91/361 |
| 5,902,090 A * | 5/1999 | Young et al. | .................. | 414/527 |
| 6,568,763 B2 * | 5/2003 | Uematsu et al. | ............ | 298/22 C |
| 6,871,575 B2 * | 3/2005 | Korogi | ........................... | 91/436 |
| 7,506,505 B2 * | 3/2009 | Fushimi | ......................... | 60/368 |
| 7,850,248 B2 * | 12/2010 | Jones | .......................... | 298/22 R |
| 8,033,614 B2 * | 10/2011 | Nabeshima et al. | ........ | 298/22 C |
| 2002/0038548 A1 * | 4/2002 | Sharkness et al. | .............. | 60/469 |

(Continued)

FOREIGN PATENT DOCUMENTS

| JP | 54-10641 Y2 | 5/1979 |
|---|---|---|
| JP | 54-120123 A | 9/1979 |
| JP | 62-023744 U | 2/1987 |
| JP | 2001-105956 A | 4/2001 |

*Primary Examiner* — H Gutman
(74) *Attorney, Agent, or Firm* — Mattingly & Malur, PC (57) ABSTRACT

In case a burden is discharged from a vessel (3), the vessel (3) is raised obliquely backward with respect to a vehicle body (2) by a hoist cylinder (10). However, when discharging work is stopped on the way, the vessel (3) is temporarily lowered to a position at which this sits on the vehicle body (2). When the vessel (3) lowers, a weight of the burden left loaded thereon acts on the hoist cylinder (10) as a load in addition to the weight of the vessel (3). A controller (35) determines whether the vessel (3) lowers in a burden loading state based on various detection signals. When the vessel (3) lowers in the burden loading state, switching of directional control valves (20) and (21) is controlled so as to decrease a contracting speed of the hoist cylinder (10), thereby prevent the vessel (3) from colliding against the vehicle body (2).

12 Claims, 5 Drawing Sheets

(56) References Cited

U.S. PATENT DOCUMENTS

| | | | |
|---|---|---|---|
| 2002/0047300 A1* | 4/2002 | Uematsu et al. | 298/22 R |
| 2005/0225159 A1* | 10/2005 | Thorvaldson | 298/19 R |
| 2008/0067855 A1* | 3/2008 | Morten | 298/1 V |
| 2008/0303336 A1* | 12/2008 | Whitfield et al. | 298/17 R |
| 2009/0206648 A1* | 8/2009 | Jones | 298/22 R |
| 2010/0026079 A1* | 2/2010 | Nabeshima et al. | 298/17 R |
| 2011/0153154 A1* | 6/2011 | Hagenbuch | 701/35 |
| 2012/0205169 A1* | 8/2012 | Montocchio et al. | 180/54.1 |
| 2012/0205178 A1* | 8/2012 | Heine et al. | 180/282 |
| 2013/0035828 A1* | 2/2013 | Tamura et al. | 701/50 |

* cited by examiner

TRANSPORTER VEHICLE

TECHNICAL FIELD

The present invention relates to a large transporter vehicle preferably used for transporting a crushed stone material or earth and sand excavated from open-air diggings, quarries, and mines, for example.

BACKGROUND ART

In general, a large transporter vehicle referred to as a dump truck is provided with a vessel (loading platform) capable of rising and falling on a frame of a vehicle body on which is loaded a large volume of objects (the crushed stone materials or the earth and sand, for example) as a transporting target on the vessel to transport and carry the objects in this state (Japanese Patent Laid-Open No. 2001-105956 A).

The transporter vehicle according to this type of conventional art is provided with the automotive vehicle body, which travels on wheels, the loading platform is provided on the vehicle body so as to be tiltable when the burden is loaded thereon, a hoist cylinder provided between the loading platform and the vehicle body so as to be extendable for extending to tilt the loading platform obliquely behind the vehicle body when discharging the burden from the loading platform, and a controller for controlling operation and stop of the hoist cylinder.

Then, such transporter vehicle travels to a transporting destination in a state in which the burden is loaded on the loading platform and thereafter extends the hoist cylinder to raise the loading platform obliquely backward and discharge the burden to an unloading site by the extending operation. After such discharging operation of the burden is finished, the hoist cylinder is contracted by manual operation of a control lever or contracting operation of the hoist cylinder is performed by a self-weight of the loading platform. By the contracting operation of the hoist cylinder, the loading platform falls so as to be gradually lowered to a position at which the loading platform sits on the vehicle body.

SUMMARY OF THE INVENTION

In the transporter vehicle according to the above-described conventional art, there is a case in which a discharging position of the burden deviates from an original discharging site (for example, the unloading site) when the loading platform is tilted behind the vehicle body to discharge the burden from the loading platform. In such a case the hoist cylinder is contracted in a state in which the burden is loaded on the loading platform to lower the loading platform once to the position at which this sits on a vehicle body side. Thereafter, the vehicle in a state in which the burden is loaded is moved forward or backward to change the discharging position of the burden.

However, when the loading platform is lowered in a burden loading state, a weight of the burden acts on the hoist cylinder as an additional load added to the weight of the loading platform itself. Therefore, a contracting speed of the hoist cylinder tends to be excessively increased and there is a case in which a large shock is generated when the loading platform sits on the vehicle body side. In order to avoid such shock, an operator of the dump truck is required to pay extra attention when performing a lowering operation of the loading platform in the burden loading state and this problematically causes deterioration in workability.

In view of the above-discussed problems with the conventional art, it is an object of the present invention to provide a transporter vehicle capable of easily performing the operation to lower the loading platform with the burden loaded thereon in which the afore-mentioned shock is prevented from occurring.

(1) In order to solve the above-described problem, the present invention is applied to a transporter vehicle including an automotive vehicle body, which travels by wheels; a loading platform tiltably provided on the vehicle body on which a burden is loaded; a hoist cylinder provided between the loading platform and the vehicle body so as to be extendable for extending to obliquely tilt the loading platform when the burden is discharged from the loading platform; a hydraulic source for generating pressure oil to be supplied to the hoist cylinder; a control valve unit provided between the hydraulic source and the hoist cylinder for controlling supply and discharge of the pressure oil to and from the hoist cylinder; and an operation device for performing switching operation of the control valve unit.

A characteristic feature of an embodiment of the present invention includes: a tilting state detector for detecting a tilting state of the loading platform with respect to the vehicle body; a burden loading detector for detecting whether the burden is loaded on the loading platform; and a controller for controlling switching of the control valve unit based on signals from the operation device, the tilting state detector, and the burden loading detector, wherein the controller includes a burden lowering determining means for determining whether it is operated such that the loading platform is lowered in the burden loading state based on the signals from the operation device, the tilting state detector, and the burden loading detector, and flow amount throttling means for throttling a flow amount of oil liquid returned from the hoist cylinder to a hydraulic source side through the control valve unit by controlling the switching of the control valve unit so as to decrease a contracting speed of the hoist cylinder when it is determined that the loading platform lowers in the burden loading state by the burden lowering determining means.

With this arrangement, the controller may control the switching of the control valve unit so as to decrease the contracting speed of the hoist cylinder, thereby throttling the flow amount of the oil liquid flowing in the control valve unit when contracting the hoist cylinder for lowering the loading platform in the burden loading state on the vehicle body side. According to this, it is possible to prevent the loading platform in the burden loading state from sitting on the vehicle body side at a high speed and to decrease the shock when the loading platform sits on the vehicle body side. Therefore, the operator of the transporter vehicle may easily perform the operation to lower the loading platform with the burden loaded thereon and may inhibit generation of the shock to improve operability and stability.

(2) In this case, according to the present invention, the burden lowering determining means is configured to judge that the loading platform is in the burden loading state by the detection signal from the burden loading detector when a weight of the loading platform side is larger than a predetermined weight value compared with the weight in an unladen state in which the burden is not loaded on the loading platform.

With this arrangement, when determining the burden loading state of the loading platform by the burden lowering determining means, the controller detects the weight of the loading platform side by the detection signal from the burden loading detector to determine whether the detected weight is significantly larger than that of the loading platform in the unladen state. When the weight of the loading platform is larger than the predetermined weight set in advance, it may be judged to be the burden loading state in which the burden is loaded on the loading platform.

(3) According to the present invention, the control valve unit has a plurality of switching positions, which are a neutral position to stop the supply and discharge of the pressure oil to stop motion of the hoist cylinder, a raising position to extend the hoist cylinder by the supply and discharge of the pressure oil to raise the loading platform, a floating position to allow falling of the loading platform by a self-weight by contracting the hoist cylinder by the self-weight of the loading platform side, and a lowering position to lower the loading platform by contracting the hoist cylinder by the supply and discharge of the pressure oil, the control valve unit has a variable throttling portion for throttling the flow amount of the oil liquid in accordance with a control signal from the controller when being switched to the floating position or the lowering position, and the flow amount throttling means is configured to throttle the flow amount of the oil liquid returned from the hoist cylinder to the hydraulic source side by using the variable throttling portion.

With this arrangement, when the control signal is output from the flow amount throttling means of the controller in a state in which the control valve unit is switched to the floating position or the lowering position, this brings the variable throttling portion into operation in accordance with the control signal. According to this, it is possible to throttle the flow amount of the oil liquid returned from the hoist cylinder to the hydraulic source side, thereby decreasing the contracting speed of the hoist cylinder.

(4) Also, according to the present invention, the control valve unit is constituted by combining a first directional control valve switched to any one position of a neutral position to stop the supply and discharge of the pressure oil to and from the hoist cylinder, a raising position to raise the loading platform by extending the hoist cylinder by the supply and discharge of the pressure oil, and a floating position to allow falling of the loading platform by a self-weight by contracting the hoist cylinder by the self-weight of the loading platform side in accordance with a control signal from the controller, and a second directional control valve switched to any one position of the neutral position, the raising position, and a lowering position to rotate the loading platform downward by contracting the hoist cylinder by the supply and discharge of the pressure oil in accordance with the control signal from the controller, the first directional control valve has one variable throttling portion for throttling the flow amount of the oil liquid in accordance with the control signal from the controller when being switched to the floating position, the second directional control valve has another variable throttling portion for throttling the flow amount of the oil liquid in accordance with the control signal from the controller when being switched to the lowering position, and the flow amount throttling means is configured to throttle the flow amount of the oil liquid returned from the hoist cylinder to the hydraulic source side by using the one variable throttling portion or the another variable throttling portion.

By configuring in this manner, in a state in which the first directional control valve of the control valve unit is switched to the floating position to contract the hoist cylinder by the self-weight of the loading platform side to allow the falling of the loading platform by the self-weight, when the control signal is output from the flow amount throttling means of the controller, one variable throttling portion is brought into operation in accordance with the control signal. According to this, it is possible to throttle the flow amount of the oil liquid returned from the hoist cylinder to the hydraulic source side, thereby decreasing the contracting speed of the hoist cylinder. On the other hand, in a state in which the second directional control valve is switched to the lowering position to contract the hoist cylinder by the supply and discharge of the pressure oil to rotate the loading platform downward, when the control signal is output from the flow amount throttling means of the controller, another variable throttling portion is brought into operation in accordance with the control signal. According to this, it is possible to throttle the flow amount of the oil liquid returned from the hoist cylinder to the hydraulic source side, thereby decreasing the contracting speed of the hoist cylinder.

(5) The present invention includes a suspension for suspending the vehicle body relative to the wheels, wherein the burden loading detector may be constituted by a pressure sensor for detecting an inner pressure of the suspension.

With this arrangement, by detecting the inner pressure of the suspension by using the pressure sensor, it is possible to comprehend whether the weight of the loading platform side is the weight in the unladen state or the weight in the burden loading state based on the detected pressure.

(6) According to the present invention, the tilting state detector may be constituted by a sit-down sensor for detecting whether the loading platform sits on the vehicle body. In this manner, it is possible to comprehend whether the loading platform is in a tilting state with respect to the vehicle body by using the sit-down sensor.

(7) Further, according to the present invention, the tilting state detector may be constituted by an angle sensor for detecting a tilting angle of the loading platform with respect to the vehicle body. In this manner, the tilting angle of the loading platform with respect to the vehicle body may be detected by using the angle sensor and it is possible to comprehend the tilting state of the loading platform.

MODE FOR CARRYING OUT THE INVENTION

Hereafter, with reference to FIGS. 1 to 5, a detailed description will be given of a transporter vehicle according to an embodiment of the present invention by taking a dump truck for transporting a crushed stone material excavated from a mine as an example.

Figure 1:
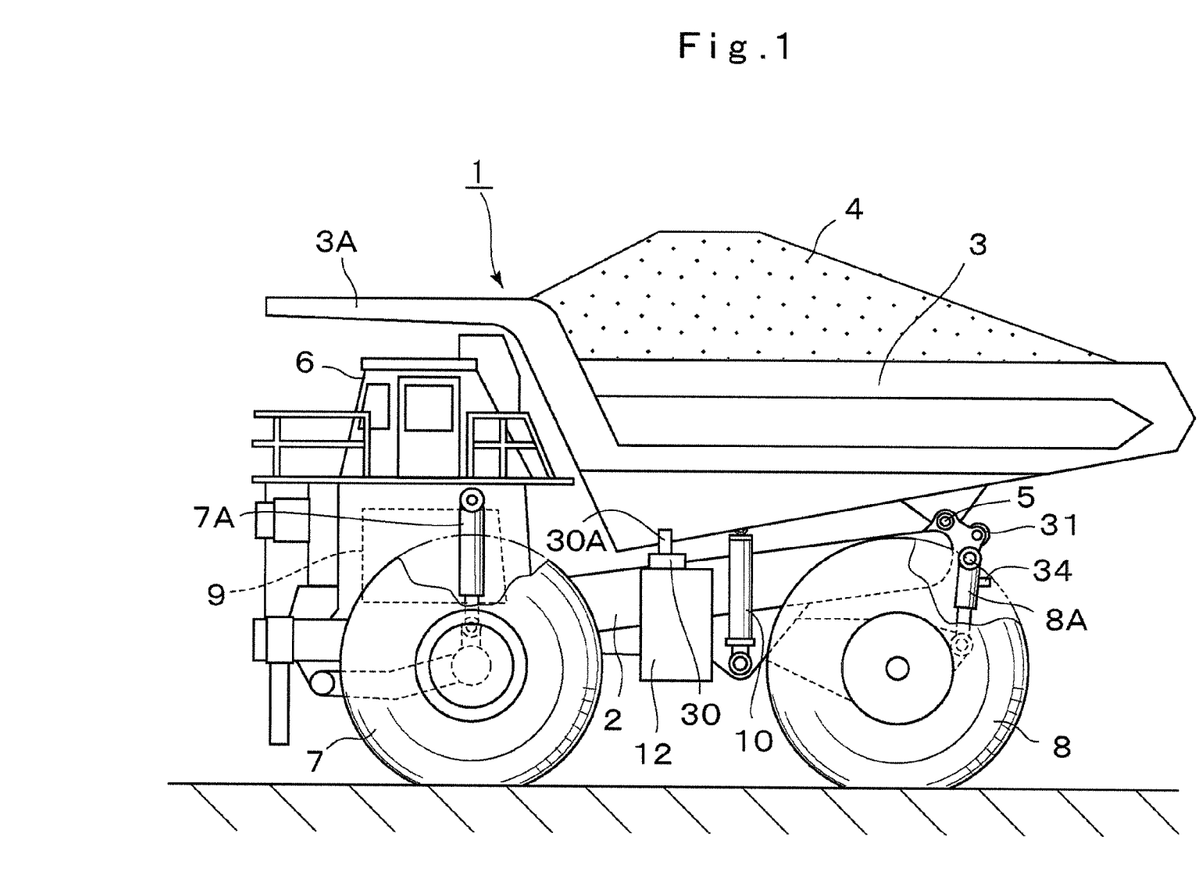
FIG. 1 is a front view showing a dump truck according to an embodiment of the present invention.
Figure 2:
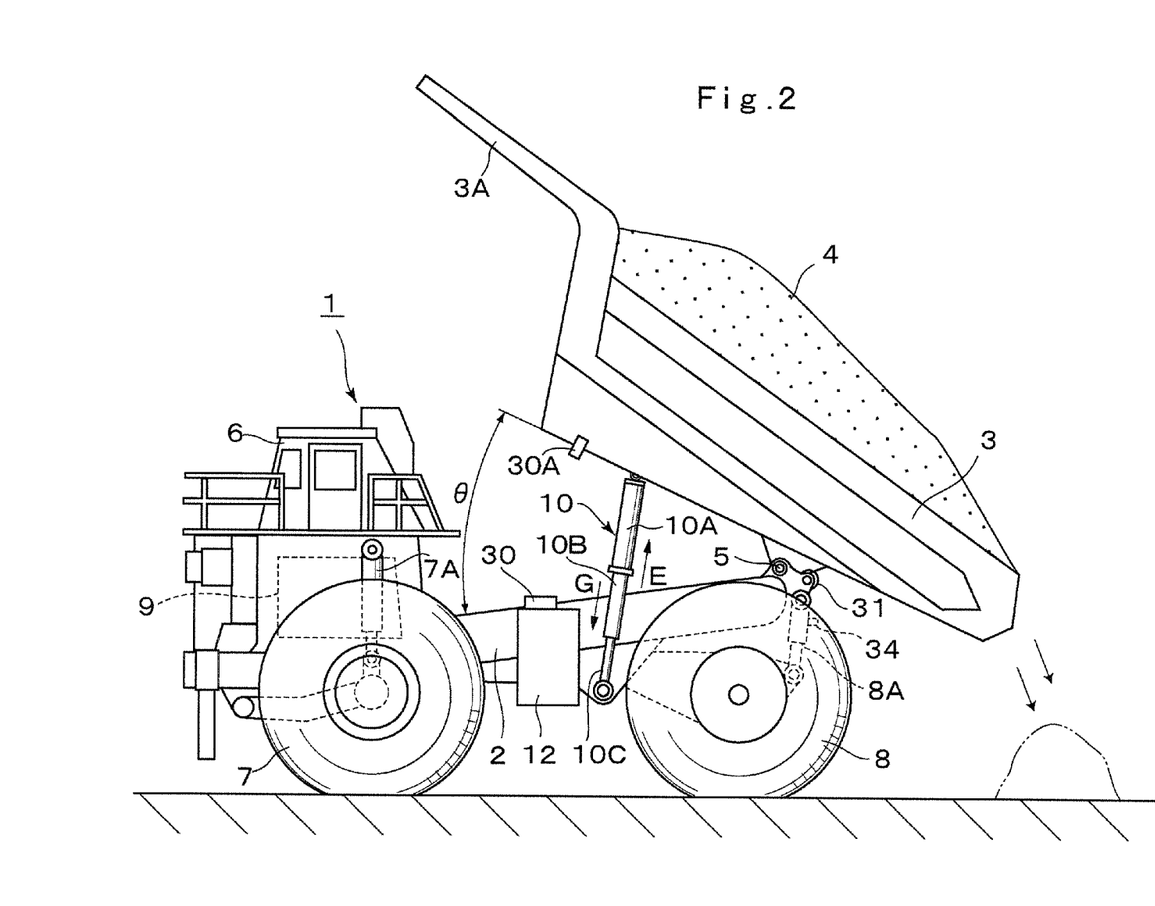
FIG. 2 is a front view showing a state in which a vessel of the dump truck is tilted obliquely backward.

In the drawings, designated at 1 is a dump truck, which is a large-sized transporter vehicle, and as shown in FIGS. 1 and 2, the dump truck 1 is largely constituted by a vehicle body 2 forming a solid frame structure, a vessel 3 as a loading platform mounted on the vehicle body 2 so as to be tiltable (liftable), and front wheels 7 and rear wheels 8 to be described later attached to the vehicle body 2.

The vessel 3 is formed as a large-sized container of which entire length reaches 10 to 13 meters for loading a large volume of heavy objects such as the crushed stone materials (hereinafter, referred to as crushed stones 4). A rear-side bottom portion of the vessel 3 is connected to a rear end side of the vehicle body 2 through a connecting pin 5 so as to be tiltable. Also, a protector 3A for covering a cab 6 to be described later from above is integrally provided on a front-side upper portion of the vessel 3.

Namely, a bottom portion side of the vessel 3 is supported on a rear portion side of the vehicle body 2 by using the connecting pin 5 so as to be rotatable. A front portion side (side of the protector 3A) of the vessel 3 is rotated upward and downward directions (raised or lowered) by using the connecting pin 5 as a fulcrum by extending or contracting a hoist cylinder 10 to be described later. With this arrangement, the vessel 3 is rotated between a transporting position shown in FIG. 1 and a discharging position shown in FIG. 2. For example, at the discharging position shown in FIG. 2, a large volume of crushed stones 4 loaded on the vessel 3 are discharged to a predetermined unloading site so as to slide down from the vessel 3 tilted backward.

Figure 3:
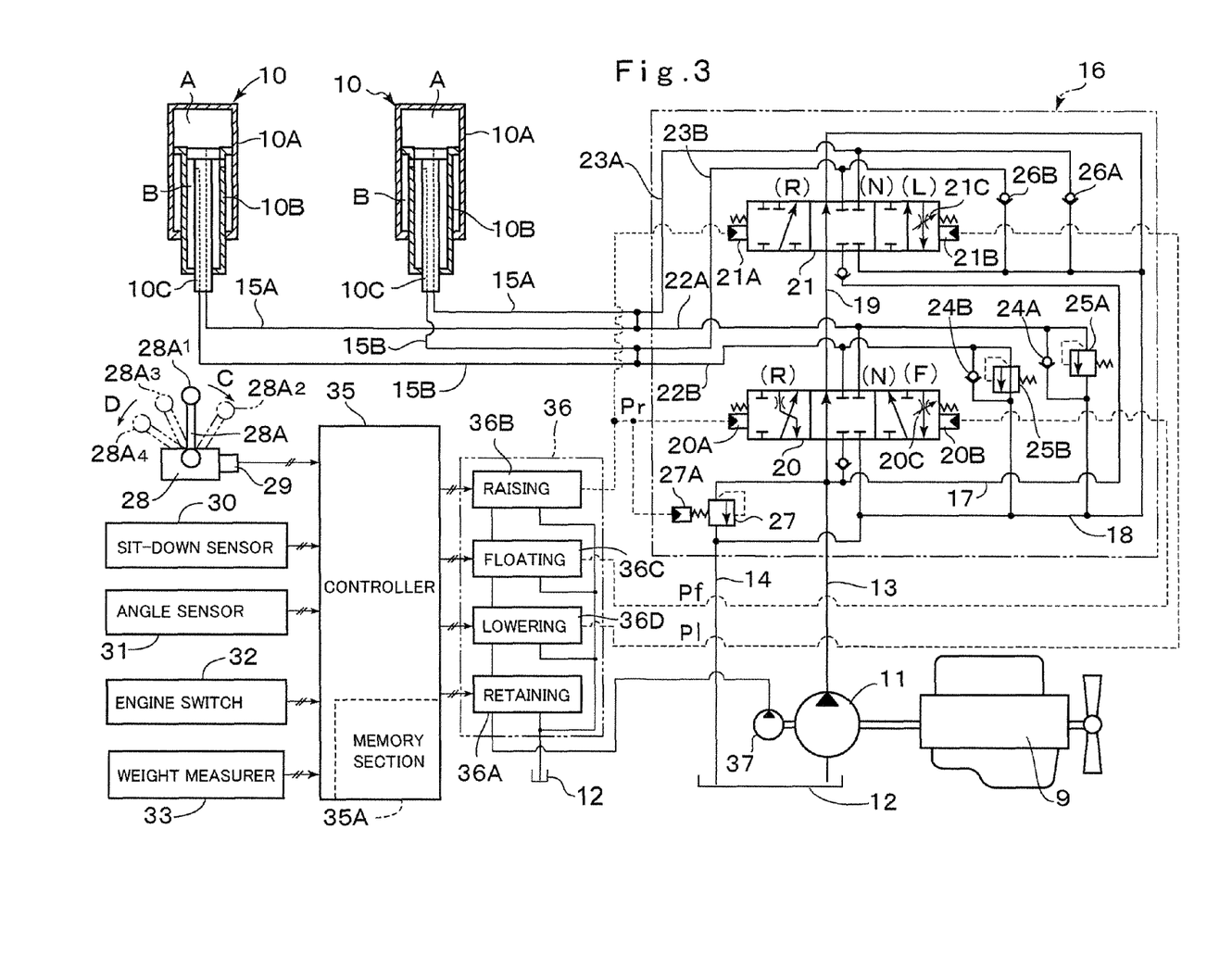
FIG. 3 is a control circuit diagram including a hydraulic circuit for operating and stopping a hoist cylinder.

Indicated at 6 is the cab located below the protector 3A to be provided on a front portion of the vehicle body 2. The cab 6 forms an operating room, which an operator of the dump truck 1 gets on and off, and a driver's seat, an accelerator pedal, a brake pedal, a steering wheel (none are shown), a control lever 28A to be described later (only one is shown in FIG. 3), an engine switch 32 and the like are provided therein.

The protector 3A of the vessel 3 serves to protect the cab 6 from a jumping stone such as a rock and to protect the operator in the cab 6 also when the vehicle (dump truck 1) overturns by substantially fully covering the cab 6 from above.

Indicated at 7 are left and right front wheels (only one is shown) which are provided rotatably on the front side of the vehicle body 2, and the front wheels 7 constitute steered wheels which are steered by an operator of the dump truck 1. The front wheels 7 are formed with a tire diameter (outside diameter dimension) of, for example, as much as 2 to 4 meters in the same way as below-described rear wheels 8. A front suspension 7A constituted by a hydraulic shock absorber or the like is provided between the front portion of the vehicle body 2 and the front wheel 7. This front suspension 7A suspends the front side of the vehicle body 2 at a position between the same and the front wheel 6.

Indicated at 8 are left and right rear wheels (only one is shown) which are provided rotatably on the rear side of the vehicle body 2, and the rear wheels 8 constitute drive wheels of the dump truck 1 which are rotatively driven by a traveling drive unit (not shown). A rear suspension 8A constituted by a hydraulic shock absorber or the like is provided between the rear wheel 8 and the rear portion of the vehicle body 2. This rear suspension 8A suspends the rear side of the vehicle body 2 at a position between the same and the rear wheel 8.

Indicated at 9 is an engine as a prime mover, and the engine 9 is constituted by a large-sized diesel engine, for example. The engine 9 is located below the cab 6 to be provided in the vehicle body 2 for rotationally driving a hydraulic pump 11 and the like to be described later, shown in FIG. 3.

Denoted at 10 are a pair of right and left hoist cylinders provided between the vehicle body 2 and the vessel 3 so as to be extendable, and the hoist cylinder 10 is constituted by a multistage (for example two-stage) hydraulic cylinder. Namely, as shown in FIG. 3, the hoist cylinder 10 is constituted by an outer tube portion 10A located on an outer side, an inner tube portion 10B provided so as to be extendable in the outer tube portion 10A to define the inside of the outer tube portion 10A into an upper oil chamber A and a lower oil chamber B, and a piston rod 10C provided in the inner tube portion 10B so as to be extendable.

The hoist cylinder 10 is configured such that the piston rod 10C extends downward when pressure oil is supplied from the hydraulic pump 11 to be described later to the oil chamber A, thereby tilting (rotating) the vessel 3 obliquely backward around the connecting pin 5 as the fulcrum (refer to FIG. 2). On the other hand, the hoist cylinder 10 is configured such that the piston rod 10C contracts when the pressure oil (oil liquid) is supplied from the hydraulic pump 11 to the oil chamber B, thereby rotating the vessel 3 downward to the transporting position (refer to FIG. 1) in which this is laid around the connecting pin 5 as the fulcrum.

Next, a hydraulic circuit for driving the hoist cylinder 10 is explained with reference to FIGS. 3 and 4.

Indicated at 11 is the hydraulic pump and the hydraulic pump 11 constitutes a hydraulic source together with a hydraulic oil tank 12 (hereinafter, referred to as a tank 12). As shown in FIGS. 1 and 2, the tank 12 is located below the vessel 3 to be attached to a side surface of the vehicle body 2. Herein, the hydraulic oil (oil liquid) accommodated in the tank 12 is sucked into the hydraulic pump 11 when the hydraulic pump 11 is rotationally driven by the engine 9. The pressure oil at high pressure is discharged from a discharge side of the hydraulic pump 11 into a pump line 13. On the other hand, return oil from the hoist cylinder 10 is discharged to the tank 12 through a low pressure tank line 14.

Indicated at 15A and 15B are a pair of hydraulic conduits connected to the oil chambers A and B of each hoist cylinder 10. The hydraulic conduits 15A and 15B are connected to the hydraulic source (the hydraulic pump 11 and the tank 12) through a control valve unit 16 to be described later for supplying the pressure oil from the hydraulic pump 11 to the oil chambers A and B of the hoist cylinder 10 and discharging the pressure oil in the oil chambers A and B to the tank 12.

Indicated at 16 is the control valve unit provided between the hydraulic pump 11 and the tank 12, and the hoist cylinder 10. As shown in FIGS. 3 and 4, the control valve unit 16 is largely constituted by a high pressure side passage 17, a low pressure side passage 18, a bypass passage 19, a first directional control valve 20, and a second directional control valve 21. In this case the first directional control valve 20 and the second directional control valve 21 are connected in parallel to each other through the high pressure side passage 17, the low pressure side passage 18, and the bypass passage 19.

The high pressure side passage 17 of the control valve unit 16 is connected to the discharge side of the hydraulic pump 11 through the pump line 13 and the low pressure side passage 18 is connected to the tank 12 through the tank line 14. The bypass passage 19 of the control valve unit 16 allows the high pressure side passage 17 to communicate with the low pressure side passage 18 when the directional control valves 20 and 21 are at a neutral position (N). According to this, the hydraulic pump 11 is put into an unloading state and a discharge pressure (pressure in the pump line 13) is maintained at a low pressure closer to the tank pressure.

A pair of actuator side oil passages 22A and 22B is provided on an output side of the first directional control valve 20 and the actuator side oil passages 22A and 22B are connected to the oil chambers A and B of the hoist cylinder 10 through the hydraulic conduits 15A and 15B, respectively. A pair of actuator side oil passages 23A and 23B is provided on an output side of the second directional control valve 21 and the actuator side oil passages 23A and 23B are connected to the oil chambers A and B of the hoist cylinder 10 through the hydraulic conduits 15A and 15B, respectively.

Each of the directional control valves 20 and 21 of the control valve unit 16 is constituted by a 6-port 3-position hydraulic pilot directional control valve, for example. The first directional control valve 20 has a pair of hydraulic pilot portions 20A and 20B. The first directional control valve 20 is switched from the neutral position (N) to a raising position (R) when a pilot pressure Pr to be described later is supplied to the hydraulic pilot portion 20A, and is switched from the neutral position (N) to a floating position (F) when a pilot pressure Pf to be described later is supplied to the hydraulic pilot portion 20B.

Figure 4:
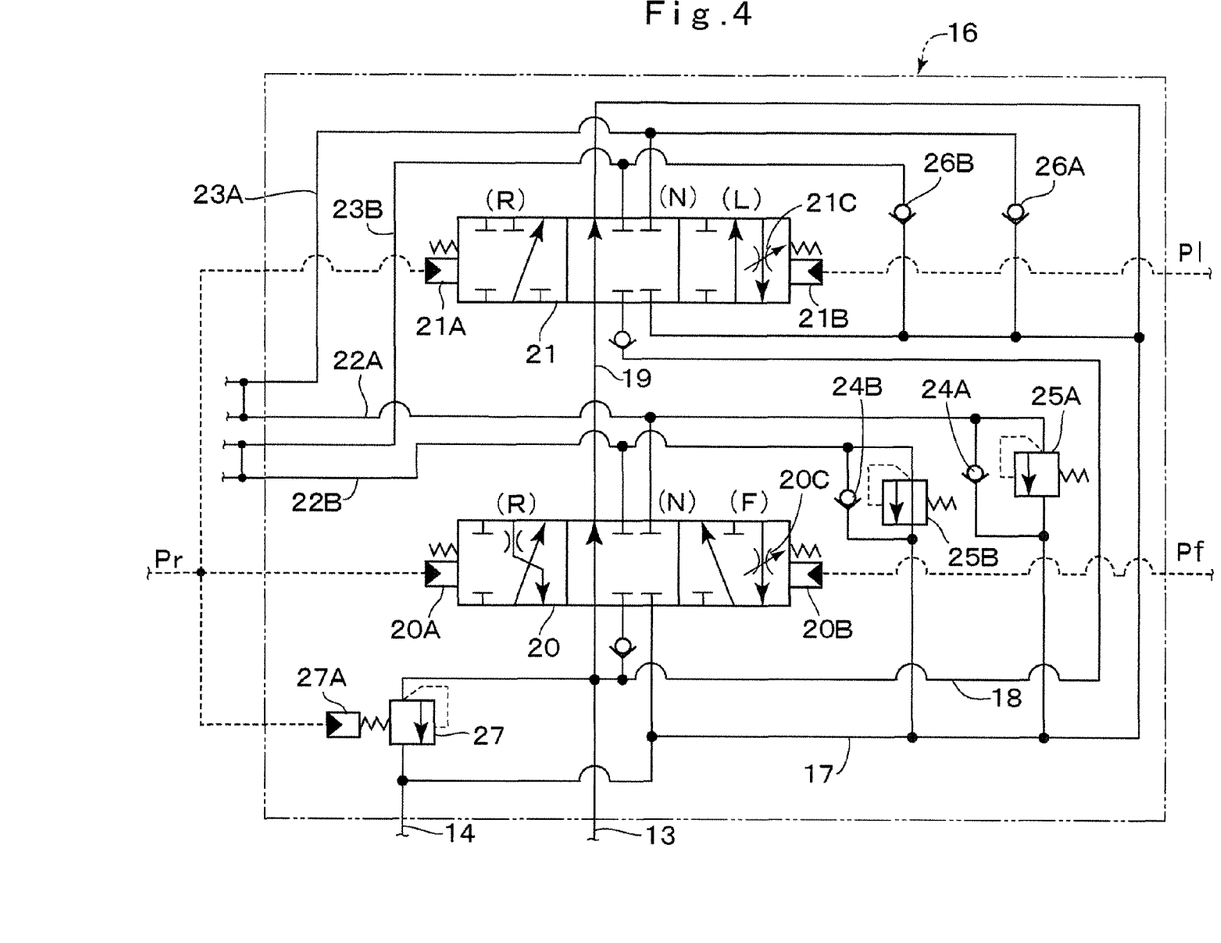
FIG. 4 is a hydraulic circuit diagram showing a control valve unit in FIG. 3 in an enlarged manner.

As shown in FIGS. 3 and 4, the first directional control valve 20 has a variable throttling portion 20C. When a throttle control signal by duty control is output from a controller 35 to be described later to a floating pilot output portion 36C, the variable throttling portion 20C exerts a function to throttle a flow amount of the oil liquid as described later according to the same. Meanwhile, unless the throttle control signal is output from the controller 35, the variable throttling portion 20C never throttles the flow amount of the oil liquid.

The second directional control valve 21 has a pair of hydraulic pilot portions 21A and 21B. The second directional control valve 21 is switched from the neutral position (N) to the raising position (R) when the pilot pressure Pr to be described later is supplied to the hydraulic pilot portion 21A, and is switched from the neutral position (N) to a lowering position (L) when a pilot pressure Pl to be described later is supplied to the hydraulic pilot portion 21B.

As shown in FIGS. 3 and 4, the second directional control valve 21 has a variable throttling portion 21C. When the signal for performing the throttle control by the duty control is output from the controller 35 to be described later to a lowering pilot output portion 36D, the variable throttling portion 21C exerts the function to throttle the flow amount of the oil liquid as described later according to the same. Meanwhile, unless the throttle control signal is output from the controller 35, the variable throttling portion 21C never throttles the flow amount of the oil liquid.

Herein, a case in which the control valve unit 16 is at a retaining position is described. Namely, in the control valve unit 16, the first and second directional control valves 20 and 21 are arranged at the neutral position (N), and this is at the retaining position to stop movement of each hoist cylinder 10. At the retaining position, supply and discharge of the pressure oil to and from each hoist cylinder 10 through the actuator side oil passages 22A and 22B and the actuator side oil passages 23A and 23B are stopped.

Also, a case in which the control valve unit 16 is at the raising position is described. In this case the first and second directional control valves 20 and 21 are switched from the neutral position (N) to the raising position (R). First, when the first and second directional control valves 20 and 21 are at the raising position (R), the pressure oil from the hydraulic pump 11 is supplied to the oil chamber A in each hoist cylinder 10 through the pump line 13, the high pressure side passage 17, the first and second directional control valves 20 and 21, the actuator side oil passages 22A and 23A, and the hydraulic conduit 15A. At that time, the first directional control valve 20 is switched to the raising position (R), and according to this, the oil liquid in the oil chamber B is returned to the tank 12 through the hydraulic conduit 15B, the actuator side oil passage 22B, the directional control valve 20, the low pressure side passage 18, and the tank line 14.

According to this, the piston rod 10C of each hoist cylinder 10 extends by the pressure oil in the oil chamber A to raise the vessel 3 to a soil discharging position shown in FIG. 2. Namely, at that time, the first and second directional control valves 20 and 21 of the control valve unit 16 are arranged at the raising position (R), and each hoist cylinder 10 extends in a direction indicated by an arrow E in FIG. 2 by hydraulic force to raise the vessel 3 upward.

On the other hand, a case in which the control valve unit 16 is at the floating position is described. In this case the first directional control valve 20 is switched from the neutral position (N) to the floating position (F). On the other hand, the second directional control valve 21 is maintained at the neutral position (N). Herein, when the first directional control valve 20 is at the floating position (F), the actuator side oil passage 22A is connected to the low pressure side passage 18 and the tank line 14 through the directional control valve 20. Also, the actuator side oil passage 22B is connected to the low pressure side passage 18 and the tank line 14 through a check valve 24B to be described later and another actuator side oil passage 23B is connected to the low pressure side passage 18 and the tank line 14 through a check valve 26B to be described later.

According to this, each hoist cylinder 10 contracts in a direction indicated by an arrow G in FIG. 2 in accordance with a load of the vessel 3 (self-weight) and the oil liquid in the oil chamber A is discharged to the tank 12 through the hydraulic conduit 15A, the actuator side oil passage 22A, and the directional control valve 20, and the oil liquid in the tank 12 is supplied to the oil chamber B from the check valves 24B and 26B to be described later through the actuator side oil passages 22B and 23B and the hydraulic conduit 15B. Namely, in this state, the first directional control valve 20 is arranged at the floating position (F) to allow the vessel 3 to fall by the self-weight.

Further, a case in which the control valve unit 16 is at the lowering position is described. In this case the first directional control valve 20 is returned to the neutral position (N) and the second directional control valve 21 is switched from the neutral position (N) to the lowering position (L). Namely, when the second directional control valve 21 is at the lowering position (L), the pressure oil from the hydraulic pump 11 is supplied to the oil chamber B of each hoist cylinder 10 through the pump line 13, the high pressure side passage 17, the second directional control valve 21, the actuator side oil passage 23B, and the hydraulic conduit 15B. On the other hand, the oil liquid in the oil chamber A is returned to the tank 12 through the hydraulic conduit 15A, the actuator side oil passage 23A, the second directional control valve 21, the low pressure side passage 18, and the tank line 14.

According to this, in each hoist cylinder 10, the inner tube portion 10B contracts into the outer tube portion 10A together with the piston rod 10C by the pressure oil supplied to the oil chamber B to rotate the vessel 3 downward to the transporting position shown in FIG. 1 by the hydraulic force of each hoist cylinder 10. Namely, in this state, the second directional control valve 21 is arranged at the lowering position (L) and each hoist cylinder 10 lowers the vessel 3 to a position sitting on the vehicle body 2 by contracting in the direction indicated by the arrow G in FIG. 2 by the hydraulic force.

Indicated at 24A and 24B are check valves for makeup arranged on a side of the first directional control valve 20. The check valves 24A and 24B are provided between the actuator side oil passages 22A and 22B and the low pressure side passage 18 so as to bypass the first directional control valve 20 as shown in FIGS. 3 and 4. The check valves 24A and 24B allow the oil liquid in the tank 12 to circulate from the low pressure side passage 18 to the oil chambers A and B of the hoist cylinder 10 through the actuator side oil passages 22A and 22B and the hydraulic conduits 15A and 15B and prevent the same from flowing in an opposite direction. It is possible to prevent a pressure in the oil chambers A and B of the hoist cylinder 10 from becoming a negative pressure by the oil liquid supplied through the check valves 24A and 24B.

Indicated at 25A and 25B are relief valves for preventing overload provided in the control valve unit 16. The relief valves 25A and 25B are provided between the actuator side oil passages 22A and 22B and the low pressure side passage 18 so as to bypass the first directional control valve 20 and are connected in parallel to the check valves 24A and 24B, respectively. One relief valve 25A out of the relief valves 25A and 25B opens for relieving an excess pressure on a side of the oil chamber A when the overload in a contracting direction acts on the hoist cylinder 10. The other relief valve 25B opens for relieving the excess pressure on a side of the oil chamber B when the overload in an extending direction acts on the hoist cylinder 10.

Indicated at 26A and 26B are check valves for makeup arranged on a side of the second directional control valve 21 of the control valve unit 16. The check valves 26A and 26B are provided between the actuator side oil passages 23A and 23B and the low pressure side passage 18 so as to bypass the second directional control valve 21. The check valves 26A and 26B allow the oil liquid in the tank 12 to circulate from the low pressure side passage 18 to the oil chambers A and B of the hoist cylinder 10 through the actuator side oil passages 23A and 23B and the hydraulic conduits 15A and 15B and prevent the same from flowing in the opposite direction. According to this, the check valves 26A and 26B supply the oil liquid to the oil chambers A and B of the hoist cylinder 10.

Indicated at 27 is a relief valve capable of changing a relief set pressure provided between the high pressure side passage 17 and the low pressure side passage 18 of the control valve unit 16. The relief valve 27 sets a maximum discharge pressure of the hydraulic pump 11 and opens when the excess pressure not smaller than the same is generated to relieve the excess pressure on a side of the tank 12. The relief valve 27 has a set pressure variable portion 27A to which the pilot pressure Pr is supplied and the relief set pressure is switched to a high pressure by the pilot pressure Pr.

Namely, the relief valve 27 sets the discharge pressure of the hydraulic pump 11 to the high pressure by setting the relief set pressure to the high pressure when the directional control valves 20 and 21 are switched to the raising position (R) by the supply of the pilot pressure Pr. On the other hand, when the supply of the pilot pressure Pr is stopped, the relief set pressure of the relief valve 27 is switched to a low pressure and this inhibits the pressure of the pressure oil from becoming unnecessarily high. Therefore, in the hydraulic pump 11, the discharge pressure is set to the low pressure when the first and second directional control valves 20 and 21 are switched to a position other than the raising position (R), that is to say, switched to the neutral position (N), the floating position (F), or the lowering position (L).

Next, an operation device for supplying the pilot pressure to the first and second directional control valves 20 and 21, which constitute the control valve unit 16, is described with reference to FIG. 3.

Denoted at 28 is a control lever assembly as the operation device for performing switching operation of the control valve unit 16, and the control lever assembly 28 is constituted by an electric lever assembly, for example, and has a control lever 28A of which tilting operation is manually performed by the operator in the cab 6. The control lever 28A is tilted to any one of the retaining position, the raising position, the floating position, and the lowering position corresponding to each switching position of the control valve unit 16.

In this case the control lever 28A has a first return position 28A1 indicated by a solid line and a second return position 28A3 indicated by a two-dot chain line in FIG. 3, and is arranged in general at the first return position 28A1 corresponding to the retaining position. When the control lever 28A is tilted from the first return position 28A1 indicated by the solid line in FIG. 3 in a direction indicated by an arrow C, this reaches a first tilting position 28A2 indicated by the two-dot chain line and the pilot pressure Pr is output from a raising pilot output portion 36B of the pilot pressure generating device 36 to be described later. Meanwhile, when the operator releases one's hand from the control lever 28A in a state of the first tilting position 28A2, the control lever 28A automatically returns to the first return position 28A1 indicated by the solid line in FIG. 3 by a returning spring (not shown).

On the other hand, when the operator tilts the control lever 28A from the first return position 28A1 indicated by the solid line to the second return position 28A3 indicated by the two-dot chain line in FIG. 3 against the returning spring, the control lever 28A is maintained by itself at this position. At that time, the pilot pressure Pf is output from the floating pilot output portion 36C to be described later.

Also, when the control lever 28A is tilted from the second return position 28A3 in a direction indicated by an arrow D, this reaches a second tilting position 28A4 indicated by the two-dot chain line and the pilot pressure Pl is output from the lowering pilot output portion 36D to be described later. When the operator releases one's hand from the control lever 28A in a state of the second tilting position 28A4, the control lever 28A is automatically returned to the second return position 28A3 by another returning spring (not shown).

Indicated at 29 is a lever sensor as operation detecting means attached to the control lever assembly 28. The lever sensor 29 detects an operation position of the control lever 28 by the operator and outputs a detection signal thereof to the controller 35 to be described later. The lever sensor 29 constitutes the operation detecting means for detecting a position out of each switching position described above at which the control valve unit 16 switched by the control lever assembly 28 is.

Indicated at 30 is a sit-down sensor for detecting whether the vessel 3 sits on the vehicle body 2. The sit-down sensor 30 is constituted by a contact type sensor located above the tank 12 to be provided on a side of the vehicle body 2 as shown in FIGS. 1 and 2 for detecting whether a projecting object 30A being a detecting target provided on a side of the vessel 3 abuts the same or keeps away from the same. Namely, the sit-down sensor 30 constitutes a tilting state detector for detecting behavior of the vessel 3 on the vehicle body 2 (a tilting state of the vessel 3) for outputting a detection signal thereof to the controller 35 to be described later.

Indicated at 31 is an angle sensor as another tilting state detector adopted in this embodiment. The angle sensor 31 is located in the vicinity of the connecting pin 5 to be provided on the rear portion side of the vehicle body 2 as shown in FIGS. 1 and 2. The angle sensor 31 detects a tilting angle of the vessel 3 with respect to the vehicle body 2 as an angle θ shown by an example in FIG. 2 to output a detection signal thereof to the controller 35.

Indicated at 32 is the engine switch provided in the cab 6 and the engine switch 32 constitutes a start switch of the engine 9. By manual operation of the engine switch 32 by the operator who sits on the driver's seat in the cab 6, the engine 9 is started or stopped.

Indicated at 33 is a weight measurer as a burden loading detector adopted in this embodiment. The weight measurer 33 constitutes to include a pressure sensor 34 shown in FIGS. 1 and 2 provided on the rear suspension 8A on a side of the rear wheel 8 for detecting whether the burden (crushed stone 4) is loaded on the vessel 3 by measuring change in weight of the vessel 3 side. Namely, the pressure sensor 34 is a weight detecting element of the weight measurer 33.

The pressure sensor 34 detects an inner pressure P of the rear suspension 8A (hereinafter, referred to as the inner pressure P). On the other hand, the weight measurer 33 measures the weight of the vessel 3 side as a vehicle body weight W (see FIG. 5) from the inner pressure P of the rear suspension 8A detected by the pressure sensor 34. Namely, the inner pressure P of the rear suspension 8A changes according to whether the crushed stone 4 is loaded on the vessel 3 and it is possible to obtain the vehicle body weight W of the rear wheel 8 side by calculating from a pressure value (inner pressure P) detected by the pressure sensor 34.

In this case, in an unladen state in which the burden including the crushed stone 4 is not loaded on the vessel 3, the vehicle body weight W is known as a weight value W0. On the other hand, in a burden loading state in which a defined amount of the crushed stone 4 is loaded on the vessel 3, the vehicle body weight W is known as a weight value Wh. Therefore, the controller 35 to be described later obtains a mean value W1 of the weight value W0 in the unladen state and the weight value Wh in the burden loading state in advance by a following equation 1 and stores the mean value W1. Then, the controller 35 determines whether the vehicle body weight W measured by the weight measurer 33 is larger than the mean value W1 to judge whether the vessel 3 is in the burden loading state or in the unladen state.

$$W1=(W0+Wh)/2 \qquad \text{[Equation 1]}$$

Designated at 35 is the controller as controlling means constituted by a microcomputer. An input side of the controller 35 is connected to the lever sensor 29, the sit-down sensor 30, the angle sensor 31, the engine switch 32, and the weight measurer 33 and an output side thereof is connected to the pilot pressure generating device 36 to be described later. Also, the controller 35 includes a memory section 35A constituted by a ROM, a RAM, a nonvolatile memory and the like. In the memory section 35A, a processing program shown in FIG. 5 to be described later, the mean value W1 for determining whether the dump truck 1 is in the burden loading state, a determinating angle $\theta 1$ (for example, $\theta 1=10$ to 20 degrees) for determining whether the vessel 3 is in the tilting state, and other values required for calculation are stored.

Herein, the controller 35 performs switching control of the control valve unit 16 for raising the vessel 3 obliquely upward or lowering the same in accordance with the processing program in FIG. 5 to be described later. The controller 35 executes flow amount throttle control by switching the control valve unit 16 so as to decrease a contracting speed of the hoist cylinder 10 when it is determined that burden lowering operation is performed so as to lower the vessel 3 in the burden loading state by the detection signals from the lever sensor 29, the sit-down sensor 30, the angle sensor 31, and the weight measurer 33.

Indicated at 36 is the pilot pressure generating device connected to the output side of the controller 35, and the pilot pressure generating device 36 is constituted by an electricity-hydraulic converting device including an electromagnetic proportional valve. The pilot pressure generating device 36 converts an electric control signal from the controller 35 to the pilot pressures Pr, Pf, and Pl, which are pressure signals, as shown in FIG. 3. Therefore, the pilot pressure generating device 36 is provided with four pilot output portions, which are a retaining pilot output portion 36A, the raising pilot output portion 36B, the floating pilot output portion 36C, and the lowering pilot output portion 36D.

Herein, suppose that the throttle control signal is output from the controller 35 to the floating pilot output portion 36C in a state in which the pilot pressure generating device 36 supplies the pilot pressure Pf by a normal flow amount to the hydraulic pilot portion 20B so as to switch the first directional control valve 20 to the floating position (F). As a result, the throttle control signal decreases the pilot pressure Pf at a rate of approximately 50 to 70% of the normal flow amount, for example. According to this, the first directional control valve 20 switched to the floating position (F) brings the variable throttling portion 20C into operation so as to throttle the flow amount of the oil liquid flowing in the first directional control valve 20 from the actuator side oil passage 22A to the low pressure side passage 18 to the flow amount corresponding to 50 to 70% of the normal flow amount, for example.

As a result, the flow amount of the oil liquid discharged from the oil chamber A of each hoist cylinder 10 to the tank 12 through the hydraulic conduit 15A, the actuator side oil passage 22A, and the first directional control valve 20 is throttled by the variable throttling portion 20C and the hoist cylinder 10 is controlled such that the contracting speed thereof is decreased.

Also, suppose that the throttle control signal is output from the controller 35 to the lowering pilot output portion 36D in a state in which the pilot pressure generating device 36 supplies the pilot pressure Pl by the normal flow amount to the hydraulic pilot portion 21B so as to switch the second directional control valve 21 to the lowering position (L). As a result, the throttle control signal decreases the pilot pressure Pl at the rate of approximately 50 to 70% of the normal flow amount, for example. According to this, the second directional control valve 21 switched to the lowering position (L) brings the variable throttling portion 21C into operation so as to throttle the flow amount of the oil liquid flowing in the second directional control valve 21 from the actuator side oil passage 23A to the low pressure side passage 18 to the flow amount corresponding to 50 to 70% of the normal flow amount, for example.

As a result, the flow amount of the oil liquid discharged from the oil chamber A of each hoist cylinder 10 to the tank 12 through the hydraulic conduit 15A, the actuator side oil passage 23A, and the second directional control valve 21 is throttled by the variable throttling portion 21C and the hoist cylinder 10 is controlled such that the contracting speed thereof is decreased.

Indicated at 37 is a pilot pump, which constitutes the pilot hydraulic source together with the tank 12, and the pilot pump 37 is driven by the engine 9 together with the hydraulic pump 11 shown in FIG. 3. The pilot pump 37 supplies the pressure oil of approximately 0.5 to 5.0 MPr (megapascals), for example, to the pilot pressure generating device 36. The pilot pressure generating device 36 outputs the pressure oil from the pilot pump 37 as the pilot pressures Pr, Pf, and Pl.

In this case, when the control lever 28A of the control lever assembly 28 is arranged at the first return position 28A1 indicated by the solid line in FIG. 3, the control signal is output from the controller 35 to the retaining pilot output portion 36A of the pilot pressure generating device 36. According to this, the pilot pressure generating device 36 decreases all the pilot pressures Pr, Pf, and Pl to pressures close to the tank pressure. Therefore, the first and second directional control valves 20 and 21 are maintained at the neutral position (N) such that the control valve unit 16 is at the retaining position.

Also, when the control lever 28A is tilted from the first return position 28A1 indicated by the solid line to the first tilting position 28A2 in the direction indicated by the arrow C in FIG. 3, the control signal is output from the controller 35 to the raising pilot output portion 36B of the pilot pressure generating device 36. According to this, the pilot pressure generating device 36 supplies the pilot pressure Pr from the raising pilot output portion 36B to the hydraulic pilot portions 20A and 21A of the first and second directional control valves 20 and 21, respectively. Therefore, the first and second directional control valves 20 and 21 are switched from the neutral position (N) to the raising position (R) in the control valve unit 16.

On the other hand, when the control lever 28A is tilted from the first return position 28A1 indicated by the solid line to the second return position 28A3 indicated by the two-dot chain line in FIG. 3, the control lever 28A is maintained by itself at that position and the control signal is output from the controller 35 to the floating pilot output portion 36C of the pilot pressure generating device 36. In this case, the first directional control valve 20 of the control valve unit 16 is switched from the neutral position (N) to the floating position (F), the pilot pressure Pf is supplied from the floating pilot output portion 36C of the pilot pressure generating device 36 to the hydraulic pilot portion 20B of the directional control valve 20. Meanwhile, in this state, the pilot pressures Pr and Pl decrease to the pressures close to the tank pressure in the second directional control valve 21 and this is returned to the neutral position (N).

Further, when the control lever 28A is tilted from the second return position 28A3 indicated by the two-dot chain line to the second tilting position 28A4 in the direction indicated by the arrow D in FIG. 3, the control signal is output from the controller 35 to the lowering pilot output portion 36D of the pilot pressure generating device 36. In this case, the second directional control valve 21 of the control valve unit 16 is switched from the neutral position (N) to the lowering position (L), so that the pilot pressure Pl is supplied from the lowering pilot output portion 36D of the pilot pressure generating device 36 to the hydraulic pilot portion 21B of the second directional control valve 21. Meanwhile, in this state, the pilot pressures Pr and Pf decrease to the pressures close to the tank pressure in the first directional control valve 20, and this is returned to the neutral position (N).

The dump truck 1 according to this embodiment has the above-described configuration and operation thereof is next explained.

First, in a stone pit such as the mine, the crushed stone 4 being a transporting target is loaded on the vessel 3 by using a large hydraulic shovel (not shown). At that time, the vessel 3 is put on the transporting position shown in FIG. 1 and the dump truck 1 transports to the unloading site in a state in which a large volume of crushed stones 4 are loaded on the vessel 3.

At the unloading site, when the operator in the cab 6 manually performs the tilting operation of the control lever 28A of the control lever assembly 28 in the direction indicated by the arrow C in FIG. 3, the control signal is output from the controller 35 to the raising pilot output portion 36B of the pilot pressure generating device 36. According to this, the pilot pressure Pr is supplied to the hydraulic pilot portions 20A and 21A of the first and second directional control valves 20 and 21, respectively, from the raising pilot output portion 36B of the pilot pressure generating device 36.

Therefore, the first and second directional control valves 20 and 21 are switched from the neutral position (N) to the raising position (R). Accordingly, the pressure oil from the hydraulic pump 11 is supplied to the oil chambers A of the two hoist cylinders 10 through the pump line 13, the high pressure side passage 17, the first and second directional control valves 20 and 21, the actuator side oil passages 22A and 23A, and the hydraulic conduit 15A. On the other hand, the oil liquid in the oil chamber B is returned to the tank 12 through the hydraulic conduit 15B, the actuator side oil passage 22B, the first directional control valve 20, the low pressure side passage 18, and the tank line 14.

As a result, the piston rod 10C of the hoist cylinder 10 extends by the pressure oil in the oil chamber A to raise the vessel 3 to the soil discharging position shown in FIG. 2 so as to tilt the same obliquely backward. Therefore, in the dump truck 1, the vessel 3 may rotate to a tilting posture as shown in FIG. 2 around the connecting pin 5 as the fulcrum, thereby discharging the crushed stone 4 in the vessel 3 to the unloading site so as to slide the same downward.

At that time, when the operator releases one's hand from the control lever 28A, the control lever 28A automatically returns to the first return position 28A1 in FIG. 3 by the returning spring. Therefore, the control signal is output from the controller 35 to the retaining pilot output portion 36A of the pilot pressure generating device 36, and the pilot pressures Pr, Pf, and Pl from the pilot pressure generating device 36 are decreased to the pressures close to the tank pressure.

According to this, the first and second directional control valves 20 and 21 may automatically return to the neutral position (N) and may stop the supply and discharge of the pressure oil to and from the oil chambers A and B of the hoist cylinder 10 and maintain the extending state of the piston rod 10C, thereby temporarily stopping the vessel 3 in the tilting posture shown in FIG. 2.

Next, when discharging work of the crushed stone 4 is finished, the operator manually performs the tilting operation of the control lever 28A from the first return position 28A1 to the second return position 28A3 indicated by the two-dot chain line in FIG. 3. According to this, the control signal is output from the controller 35 to the floating pilot output portion 36C of the pilot pressure generating device 36. Therefore, the pilot pressure generating device 36 outputs the pilot pressure Pf from the floating pilot output portion 36C to the hydraulic pilot portion 20B of the first directional control valve 20 to switch the directional control valve 20 to the floating position (F). Also, the second directional control valve 21 automatically returns to the neutral position (N).

According to this, the first directional control valve 20 switched to the floating position (F) connects the actuator side oil passage 22A to the low pressure side passage 18 and the tank line 14. On the other hand, the actuator side oil passage 22B is connected to the low pressure side passage 18 and the tank line 14 through the check valve 24B. Further, the actuator side oil passage 23B is connected to the low pressure side passage 18 and the tank line 14 through the check valve 26B.

As a result, the hoist cylinder 10 contracts in the direction indicated by the arrow G in FIG. 2 in accordance with the load from the vessel 3 (self-weight) and the oil liquid in the oil chamber A is discharged to the tank 12 and the oil liquid in the tank 12 is supplied to the oil chamber B through the check valves 24B and 26B. The hoist cylinder 10 is allowed to fall by the self-weight of the vessel 3 and may lower the vessel 3 to the transporting position shown in FIG. 1 and may allow the vessel 3 to sit on the vehicle body 2.

On the other hand, when the dump truck 1 is in a tilting state on unevenness of a site of work, a tilted ground and the like, there is a case in which the vessel 3 does not lower by the self-weight even when the first directional control valve 20 of the control valve unit 16 is switched to the floating position (F). However, in such a case, by large tilting operation of the control lever 28A in the direction indicated by the arrow D in FIG. 3 by the operator, it is possible to output the control signal from the controller 35 to the lowering pilot output portion 36D of the pilot pressure generating device 36.

Therefore, the pilot pressure generating device 36 outputs the pilot pressure Pl corresponding to the control signal from the lowering pilot output portion 36D to the hydraulic pilot portion 21B of the second directional control valve 21 to switch the second directional control valve 21 to the lowering position (L). According to this, the second directional control valve 21 supplies the pressure oil from the hydraulic pump 11 to the oil chamber B of each hoist cylinder 10 through the pump line 13, the high pressure side passage 17, the actuator side oil passage 23B, and the hydraulic conduit 15B, and returns the oil liquid in the oil chamber A to the tank 12 through the hydraulic conduit 15A, the actuator side oil passage 23A, the second directional control valve 21, the low pressure side passage 18, and the tank line 14.

According to this, the inner tube portion 10B contracts into the outer tube portion 10A together with the piston rod 10C by the pressure oil supplied to the oil chamber B in the hoist cylinder 10, and it is possible to rotate the vessel 3 downward to the transporting position shown in FIG. 1 by the hydraulic force of the hoist cylinder 10 and to forcibly allow the vessel 3 to sit on the vehicle body 2.

However, when the second directional control valve 21 of the control valve unit 16 is switched to the lowering position (L) in this manner, the hoist cylinder 10 is contracted in the direction indicated by the arrow G in FIG. 2 by the hydraulic force, so that a shock might be generated when the vessel 3 sits on the vehicle body 2 and there is a possibility that an extra load is applied to the vessel 3 and the vehicle body 2.

Therefore, the operator of the dump truck 1 returns the control lever 28A to the second return position 28A3 indicated by the two-dot chain line in FIG. 3 to be maintained by itself while the vehicle travels. According to this, in the control valve unit 16, the first directional control valve 20 is switched to the floating position (F) and the second directional control valve 21 returns to the neutral position (N). As a result, the vessel 3 remains sitting on the vehicle body 2 by the self-weight and it is also possible to maintain the contracting state of the hoist cylinder 10 by utilizing the self-weight of the vessel 3 side.

In the middle of soil dropping work in which the vessel 3 is largely tilted behind the vehicle body 2 to discharge the burden subject such as sand and the crushed stone 4 from the vessel 3 by extending the hoist cylinder 10 as described above, there is a case in which the discharging position of the burden deviates from an original discharging site (for example, the unloading site). In such a case the vessel 3 is once lowered to the position at which this sits on a vehicle body 2 side by contracting the hoist cylinder 10 in a state in which the burden is loaded on the vessel 3. Thereafter, by moving the dump truck 1 in the burden loading state forward or backward such that the discharging position of the burden is moved to be at a normal position.

However, when the vessel 3 is lowered in the burden loading state as described above, the weight of the burden acts as a load in addition to the weight of the vessel 3 on the hoist cylinder 10. Therefore, the contracting speed of the hoist cylinder 10 tends to excessively increase and there is a case in which the large shock is generated when the vessel 3 sits on the vehicle body 2 side. Therefore, in order to avoid such shock, the operator of the dump truck 1 is required to pay attention to inhibit the shock when performing operation to temporarily lower the vessel 3 in the burden loading state, and this causes lowering of workability.

Figure 5:
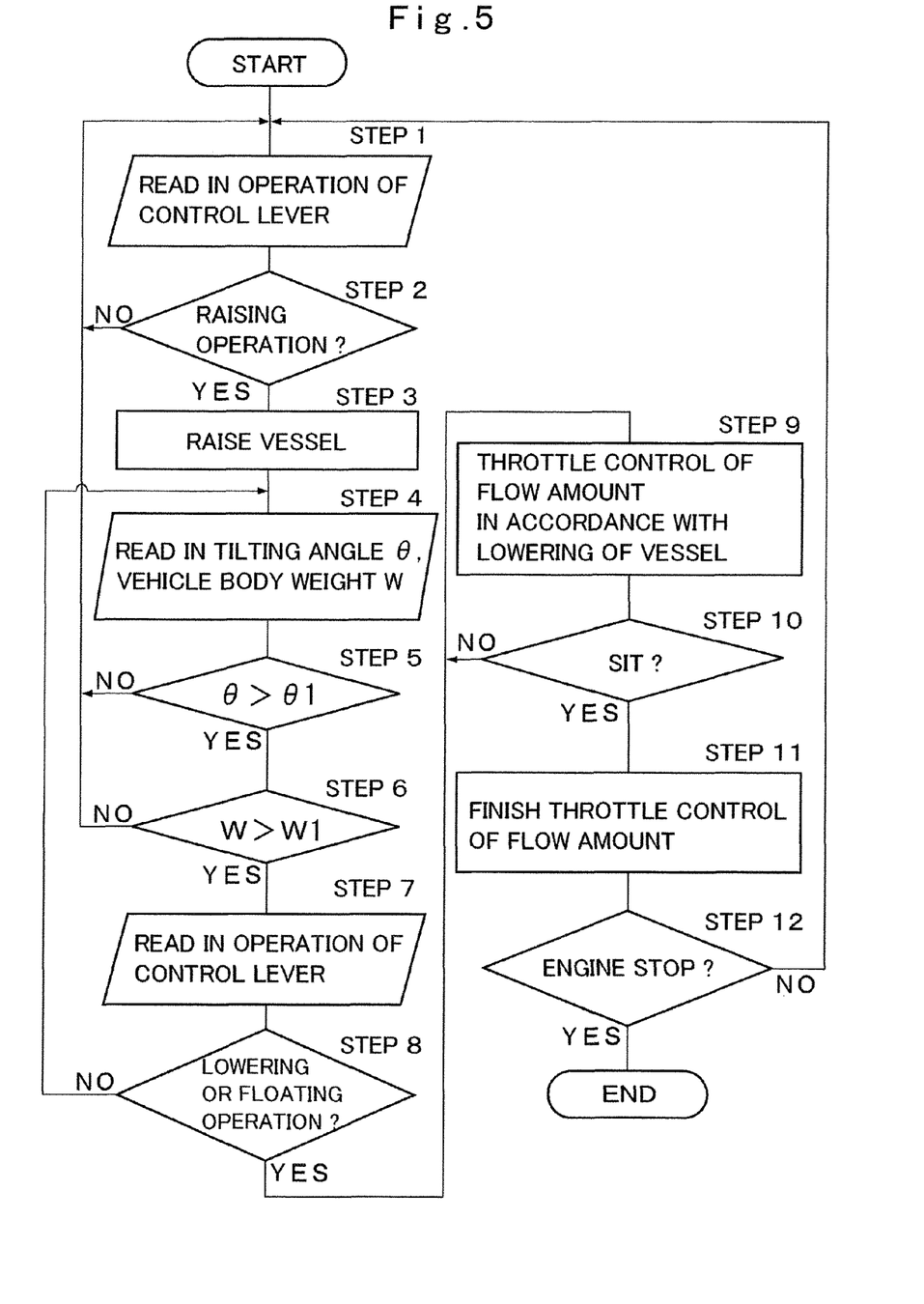
FIG. 5 is a flow chart showing a switch control process of the control valve unit by a controller in FIG. 3.

Then, in this embodiment, the switching control of the control valve unit 16 by the controller 35 is performed in accordance with the processing program shown in FIG. 5 and the operation to lower the vessel 3 with the burden loaded thereon may be easily performed, so that the operability and stability may be improved while inhibiting generation of the shock.

Namely, when the processing operation in FIG. 5 is started, the detection signal is read from the lever sensor 29 at a step 1 and it is determined whether raising operation of the vessel 3 is performed at a next step 2. While it is determined "NO" at the step 2, the procedure returns to the step 1. When it is determined "YES" at the step 2, the raising operation of the vessel 3 is performed, so that the vessel 3 is upwardly raised from the vehicle body 2 at a step 3.

At a next step 4, the tilting angle θ of the vessel 3 is read from the angle sensor 31 and the vehicle body weight W of the rear wheel 8 side is read from the weight measurer 33. At a next step 5, it is determined whether the tilting angle θ of the vessel 3 is larger than the determinating angle θ1 (for example, θ1=10 to 20 degrees). While it is determined "NO" at the step 5, the procedure returns to the step 1.

On the other hand, when it is determined "YES" at the step 5, it may be judged that the vessel 3 is raised above the vehicle body 2 to be in the tilting posture, so that the procedure shifts to a step 6 to determine whether the vehicle body weight W of the rear wheel 8 side is larger than the mean value W1 read from the memory section 35A. While it is determined "NO" at the step 6, the procedure returns to the step 1 to continue a subsequent process.

When it is determined "YES" at the step 6, it may be determined that the vessel 3 is in the burden loading state and also in the tilting state raised from the vehicle body 2. At a next step 7, the detection signal is read from the lever sensor 29, and at a next step 8, it is determined whether lowering operation or floating operation of the vessel 3 is performed. Namely, it is determined whether the switching operation to the floating position (F) is performed to the first directional control valve 20 of the control valve unit 16 or whether the switching operation to the lowering position (L) is performed to the second directional control valve 21.

As far as it is determined "NO" at the step 8, the raising operation or retaining operation of the vessel 3 is performed, so that the procedure returns to the step 4 and a subsequent process is continued. Therefore, when the work to largely tilt the vessel 3 behind the vehicle body 2 to discharge the burden from the vessel 3 is normally performed, the discharge of the burden is continued. Therefore, in a state in which the discharging work of the burden is finished and the load becomes light, it is determined "NO" by a determination process at the step 6. Namely, the vehicle body weight W of the rear wheel 8 side becomes the weight smaller than the mean value W1.

However, as described above, there is a case in which the vessel 3 is once lowered to the position at which this sits on the vehicle body 2 in a state in which the burden is loaded on the vessel 3 before the discharging work of the burden is finished because the discharging position of the burden deviates from the original discharging position. In this case the lowering operation of the control lever 28A is performed, so that it is determined "YES" at the step 8. Therefore, in this state, the vessel 3 is lowered in the burden loading state, the weight of the burden acts on the hoist cylinder 10 as the load in addition to the weight of the vessel 3, so that the contracting speed of the hoist cylinder 10 tends to excessively increase.

Then, the throttle control of the flow amount in accordance with the lowering of the vessel 3 is executed at a next step 9. Namely, the controller 35 outputs the throttle control signal to the floating pilot output portion 36C or the lowering pilot output portion 36D of the pilot pressure generating device 36 to bring the variable throttling portion 20C of the first directional control valve 20 or the variable throttling portion 21C of the second directional control valve 21 into operation.

In this case, in a state in which the pilot pressure Pl is supplied to the hydraulic pilot portion 21B so as to switch the first directional control valve 20 to the floating position (F), for example, the throttle control signal is output from the controller 35 to the lowering pilot output portion 36D of the pilot pressure generating device 36. According to this, the first directional control valve 20 switched to the floating position (F) throttles the flow amount of the oil liquid flowing in the floating position (F) of the first directional control valve 21 from the side of the actuator side oil passage 22A to the low pressure side passage 18 to 50 to 70% of the normal flow amount by the variable throttling portion 20C.

As a result, the flow amount of the oil liquid discharged from the oil chamber A of each hoist cylinder 10 to the tank 12 through the hydraulic conduit 15A, the actuator side oil passage 22A, and the first directional control valve 21 is throttled by the variable throttling portion 20C and the hoist cylinder 10 is controlled such that the contracting speed thereof decreases.

On the other hand, in a state in which the pilot pressure Pl is supplied to the hydraulic pilot portion 21B so as to switch the second directional control valve 21 to the lowering position (L), the throttle control signal is output from the controller 35 to the lowering pilot output portion 36D of the pilot pressure generating device 36. According to this, the second directional control valve 21 switched to the lowering position (L) throttles the flow amount of the oil liquid flowing in the second directional control valve 21 from the side of the actuator side oil passage 23A to the low pressure side passage 18 to 50 to 70% of the normal flow amount by the variable throttling portion 21C.

As a result, the flow amount of the oil liquid discharged from the oil chamber A of each hoist cylinder 10 to the tank 12 through the hydraulic conduit 15A, the actuator side oil passage 23A, and the second directional control valve 21 is throttled by the variable throttling portion 21C and the hoist cylinder 10 is controlled such that the contracting speed thereof is decreased.

Next, at a step 10, it is determined whether the vessel 3 sits on the vehicle body 2 by the detection signal from the sit-down sensor 30. While it is determined "NO" at the step 10, the procedure returns to the step 9 to continue the throttle control of the flow amount in accordance with the lowering of the vessel 3.

However, when it is determined "YES" at the step 10, it may be judged that the vessel 3 sits on the vehicle body 2, so that the procedure shifts to a next step 11 to finish the throttle control of the flow amount by the above-described variable throttling portion 20C or 21C. Then, at a next step 12, it is determined whether the engine 9 is stopped by a signal from the engine switch 32.

When it is determined "YES" at the step 12, the process is finished and while it is determined "NO" at the step 12, the procedure returns to the step 1 to continue a subsequent process. The controller 35 continues the switching control of the control valve unit 16 in accordance with the tilting operation of the control lever 28A.

Therefore, according to this embodiment, when the vessel 3 is lowered to the position at which this sits on the vehicle body 2 side in the state in which the burden is loaded on the vessel 3, the controller 35 controls the switching of the control valve unit 16 so as to decrease the contracting speed of the hoist cylinder 10 and may throttle the flow amount of the oil liquid flowing in the first directional control valve 20 or the second directional control valve 21 by the variable throttling portion 20C or 21C.

According to this, it is possible to inhibit the vessel 3 in the burden loading state from sitting on the vehicle body 2 side at a high speed, so that it is possible to decrease the shock when the vessel 3 sits on the vehicle body 2 side. Therefore, the operator of the dump truck 1 may easily perform the operation to lower the vessel 3 with the burden loaded thereon without paying special attention, and it is possible to improve the operability and the stability of the control lever 28A.

Meanwhile, in the above-described embodiment, the processes at the steps 5 to 8 shown in FIG. 5 are a specific example of unloading determining means being a component of the present invention, and the process at the step 9 illustrates a specific example of flow amount throttling means.

Also, in the above-described embodiment, a case has been explained by citing the tilting state detector constituted by the sit-down sensor 30 and the angle sensor 31 as an example. However, the present invention is not limited to the same, and a configuration may be adopted to detect whether the vessel 3 is in the tilting state by using only the angle sensor 31, for example. Also, it may be configured to detect whether the vessel 3 sits on the vehicle body 2, that is to say, whether the vessel 3 is in the tilting state by using only the sit-down sensor 30.

On the other hand, in the above-described embodiment, a case has been explained by citing an example of determining the burden loading state of the vessel 3 by whether the vehicle body weight W is larger than the mean value W1 of the weight value W0 in the unladen state and the weight value Wh in the burden loading state. However, the present invention is not limited to the same, and it may be configured to determine the burden loading state of the vessel 3 by whether the vehicle body weight W is larger than the weight value W0 in the unladen state by a predetermined weight (for example, approximately 50 to 100 kg or thereabouts) or larger, for example.

Also, in the above-described embodiment a case has been explained by citing the control valve unit 16 constituted by the two directional control valves 20 and 21 as an example. However, the present invention is not limited to the same, and it may constitute the control valve unit of which switching operation to four positions (for example, the neutral position, the raising position, the floating position, and the lowering position) is performed by using one directional control valve, for example.

Further, in the above-described embodiment, it is explained by citing a rear wheel-drive dump truck 1 of the transporter vehicle as an example. However, the present invention is not limited to the same, and may be applied to a front-wheel drive dump truck or a four-wheel-drive dump truck in which the front and rear wheels are driven together, for example. On the other hand, this may be applied to the vehicle other than the dump truck as long as this is the transporter vehicle provided with a traveling wheel.

DESCRIPTION OF REFERENCE NUMERALS

1: Dump truck (Transporter vehicle)
2: Vehicle body
3: Vessel (Loading platform)
4: Crushed stone (Burden being transporting target)
5: Connecting pin
6: Cab
7: Front wheel
7A: Front suspension 8: Rear wheel
8A: Rear suspension
9: Engine
10: Hoist cylinder
11: Hydraulic pump (Hydraulic source)
12: Hydraulic oil tank (Hydraulic source)
16: Control valve unit
20, 21: Directional control valve
20C: Variable throttling portion (One variable throttling portion)
21C: Variable throttling portion (Another variable throttling portion)
28: Control lever assembly (Operation device)
28A: Control lever
29: Lever sensor (Operation detecting means)
30: Sit-down sensor (Tilting state detector)
31: Angle sensor (Tilting state detector)
33: Weight measurer (Burden loading detector)
34: Pressure sensor
35: Controller
36: Pilot pressure generating device

The invention claimed is:

1. A transporter vehicle comprising:
an automotive vehicle body which travels on wheels;
a loading platform tiltably disposed on said vehicle body on which a burden is loaded;
a hoist cylinder extendably disposed between said loading platform and said vehicle body so as to obliquely tilt said loading platform to discharge said burden from said loading platform;
a hydraulic source for generating pressurized oil to be supplied to said hoist cylinder;
a control valve unit disposed between said hydraulic source and said hoist cylinder to control supplying and discharging of said pressurized oil to and from said hoist cylinder; and
an operation device for switching positions of operation of said control valve unit, where said control valve unit has a plurality of positions including a neutral position to stop said hoist cylinder, a raising position to extend said hoist cylinder by the supply and discharge of said pressurized oil and raise said loading platform, a floating position to allow falling of said loading platform by contracting said hoist cylinder by a self-weight of said loading platform, and a lowering position to lower said loading platform by contracting said hoist cylinder by the supply and discharge of said pressurized oil;
a tilting state detector for detecting a tilting state of said loading platform with respect to said vehicle body;
a burden loading detector for detecting a burden loading state where said burden is loaded on said loading platform; and
a controller configured to control switching of said control valve unit based on signals from said operation device, said tilting state detector, and said burden loading detector,
wherein said control valve unit includes a variable throttling portion for throttling the flow amount of the pressurized oil in accordance with a control signal from said controller when being switched to said floating position or said lowering position,
wherein said controller is further configured to:
determine whether said loading platform is in the tilting state with respect to said vehicle body based on said signal from said tilting state detector;
determine whether said loading platform is in the burden loading state where said burden is loaded on said loading platform based on said signal from said burden loading detector;
determine whether said hoist cylinder is operated such that said loading platform is being lowered in the burden loading state based on said signals from said operation device, said tilting state detector, and said burden loading detector when said loading platform is in the tilting state and in the burden loading state; and
throttle a flow amount of said pressurized oil returned from said hoist cylinder to said hydraulic source through said variable throttling portion of said control valve unit by controlling the switching of said control valve unit so as to decrease a contracting speed of said hoist cylinder when said controller has determined said hoist cylinder is operated such that said loading platform is being lowered in the burden loading state.

2. The transporter vehicle according to claim 1, wherein said controller is further configured to determine that said loading platform is in the burden loading state by said signal from said burden loading detector when a weight of said loading platform is larger than a predetermined weight value compared with the weight in an unladen state in which said burden is not loaded on said loading platform.

3. The transporter vehicle according to claim 1, wherein said control valve unit includes:
a first directional control valve switched to any one position of said neutral position, said raising position, and said floating position in accordance with said control signal from said controller; and
a second directional control valve switched to any one position of said neutral position, said raising position, and a lowering position in accordance with said control signal from said controller,
wherein said first directional control valve includes a first variable throttling portion for throttling the flow amount of the pressurized oil in accordance with said control signal from said controller when being switched to said floating position,
wherein said second directional control valve includes a second variable throttling portion for throttling the flow amount of the pressurized oil in accordance with said control signal from said controller when being switched to said lowering position, and wherein said controller is further configured to throttle the flow amount of the pressurized oil returned from said hoist cylinder to said hydraulic source with said first variable throttling portion or said second variable throttling portion.

4. The transporter vehicle according to claim 1, further comprising:
a suspension for suspending said vehicle body relative to said wheels, and wherein said burden loading detector is a pressure sensor detecting an inner pressure of said suspension.

5. The transporter vehicle according to claim 1, wherein said tilting state detector is a sit-down sensor detecting whether said loading platform sits on said vehicle body.

6. The transporter vehicle according to claim 1, wherein said tilting state detector is an angle sensor for detecting a tilting angle of said loading platform with respect to said vehicle body.

7. A transporter vehicle comprising:
an automotive vehicle body which travels on wheels;
a loading platform tiltably disposed on said vehicle body on which a burden is loaded;

one or more hoist cylinders extendably disposed between said loading platform and said vehicle body so as to obliquely tilt said loading platform to discharge said burden from said loading platform;

a hydraulic source that supplies pressurized oil to said one or more hoist cylinders;

a control valve unit disposed between said hydraulic source and said one or more hoist cylinders which operates to control supplying and discharging of said pressurized oil to and from said one or more hoist cylinders;

a control lever assembly to switch positions of operation of said control valve unit;

an angle sensor to detect a tilting state of said loading platform with respect to said vehicle body;

a weight sensor to detect whether said burden is loaded on said loading platform; and a controller configured to control switching of said control valve unit based on signals from said control lever assembly, said angle sensor, and said weight sensor, wherein said control valve unit has a plurality of positions including a neutral position to stop the supply and discharge of said pressurized oil and stop said one or more hoist cylinders, a raising position to extend said one or more hoist cylinders by the supply and discharge of said pressurized oil and raise said loading platform, a floating position to allow falling of said loading platform by contracting said one or more hoist cylinders by a self-weight of said loading platform, and a lowering position to lower said loading platform by contracting said one or more hoist cylinders by the supply and discharge of said pressurized oil, wherein said control valve unit includes a variable throttling portion for throttling the flow amount of the pressurized oil in accordance with a control signal from said controller when being switched to said floating position or said lowering position, wherein said controller is further configured to:

determine whether said loading platform is in the tilting state with respect to said vehicle body based on said signal from said angle sensor;

determine whether said loading platform is in a burden loading state on which said burden is loaded based on said signal from said weight sensor; and determine whether said one or more hoist cylinders are operated such that said loading platform is being lowered in the burden loading state based on said signals from said control lever assembly, said angle sensor, and said weight sensor, when said loading platform is in the tilting state and in the burden loading state, and wherein said control valve unit switches to throttle a flow amount of pressurized oil returned from said one or more hoist cylinder to said hydraulic source through said variable throttling portion so as to decrease a contracting speed of said one or more hoist cylinder when said controller determines that said one or more hoist cylinder is operated such that said loading platform is being lowered in the burden loading state by the controller.

8. The transporter vehicle according to claim 7, wherein said controller is further configured to judge that said loading platform is in the burden loading state by said signal from said weight sensor when a weight of said loading platform is larger than a predetermined weight value compared with the weight in an unladen state in which said burden is not loaded on said loading platform.

9. The transporter vehicle according to claim 7, wherein said control valve unit includes:

a first directional control valve switched to any one position of said neutral position, said raising position, and said floating position in accordance with said control signal from said controller; and a second directional control valve switched to any one position of said neutral position, said raising position, and said lowering position in accordance with said control signal from said controller, wherein said first directional control valve includes a first variable throttling portion for throttling the flow amount of the pressurized oil in accordance with said control signal from said controller when being switched to said floating position, wherein said second directional control valve includes a second variable throttling portion for throttling the flow amount of the pressurized oil in accordance with said control signal from said controller when being switched to said lowering position, and wherein said controller is further configured to throttle the flow amount of the pressurized oil returned from said one or more hoist cylinders to said hydraulic source with said first variable throttling portion or said second variable throttling portion.

10. The transporter vehicle according to claim 7, further comprising: a suspension for suspending said vehicle body relative to said wheels, and wherein said weight sensor is a pressure sensor detecting an inner pressure of said suspension.

11. The transporter vehicle according to claim 7, wherein said angle sensor is a sit-down sensor detecting whether said loading platform sits on said vehicle body.

12. The transporter vehicle according to claim 7, wherein said angle sensor is an angle sensor for detecting a tilting angle of said loading platform with respect to said vehicle body.

* * * * *